United States Patent [19]

Elkins

[11] Patent Number: 4,991,723
[45] Date of Patent: Feb. 12, 1991

[54] ADJUSTABLE UNIVERSAL GUN RACK

[76] Inventor: Johnny C. Elkins, P.O. Box 2599, San Angelo, Tex. 76902

[21] Appl. No.: 407,976

[22] Filed: Sep. 15, 1989

[51] Int. Cl.⁵ ............................................. A47F 7/00
[52] U.S. Cl. ..................................... 211/64; 211/87; 224/42.45 R; 248/295.1
[58] Field of Search ............... 211/64, 87; 248/295.1, 248/298, 231.2; 224/42.45 R, 913

[56] References Cited

U.S. PATENT DOCUMENTS

| | | | |
|---|---|---|---|
| 2,788,188 | 4/1957 | Smith et al. | 248/298 X |
| 3,931,893 | 1/1976 | Elkins et al. | 211/64 |
| 4,058,221 | 11/1977 | Elkins et al. | 211/64 X |
| 4,108,313 | 8/1978 | Bogar | 211/64 |
| 4,450,989 | 5/1984 | Bogar | 211/64 X |
| 4,596,334 | 6/1986 | Daulton | 211/64 |
| 4,648,516 | 3/1987 | Elkins | 211/64 |

FOREIGN PATENT DOCUMENTS 207313  10/1939  Switzerland ................ 248/231.2

*Primary Examiner*—Robert W. Gibson, Jr.
*Attorney, Agent, or Firm*—Marcus L. Bates

[57] ABSTRACT

A gun mount includes two spaced adjustable gun racks, and each of the gun racks are arranged to be held in position by the frame of a rear window of a pickup truck, for example, so that a plurality of guns can be supported at spaced intervals thereon and safely transported in a pick-up truck. The pair of racks each include an adjustable spreader bar that terminate in blades at opposed ends thereof, with the blades terminating in attached relationship respective to the frame of a vehicle window. A cradle support assembly has opposed ends which also attach to the blade members and are spaced from the spreader bar to thereby provide an unusual adjustable rack assembly that resist lateral loads in an unexpected manner. Any number of cradles are attached to the cradle support assembly and provides the means by which fire arms, fishing tackle, and other such paraphernalia can be supported and stored behind the driver of a pickup truck. The spreader bar is placed in compression and thereby urges the blades apart, and the blades have a flat surface that bears against the window glass, and further include teeth that engage the interior of the window frame and thereby hold each of the racks in fixed relationship due to the compressive forces which urge the blade members away from one another. The cradle support assembly has opposed marginal lengths that terminate in fixed relationship respective to the opposed blade members and transfer the load of a fire arm into both the upper and lower blade members as well as adding to the structural integrity of the rack assembly.

12 Claims, 1 Drawing Sheet

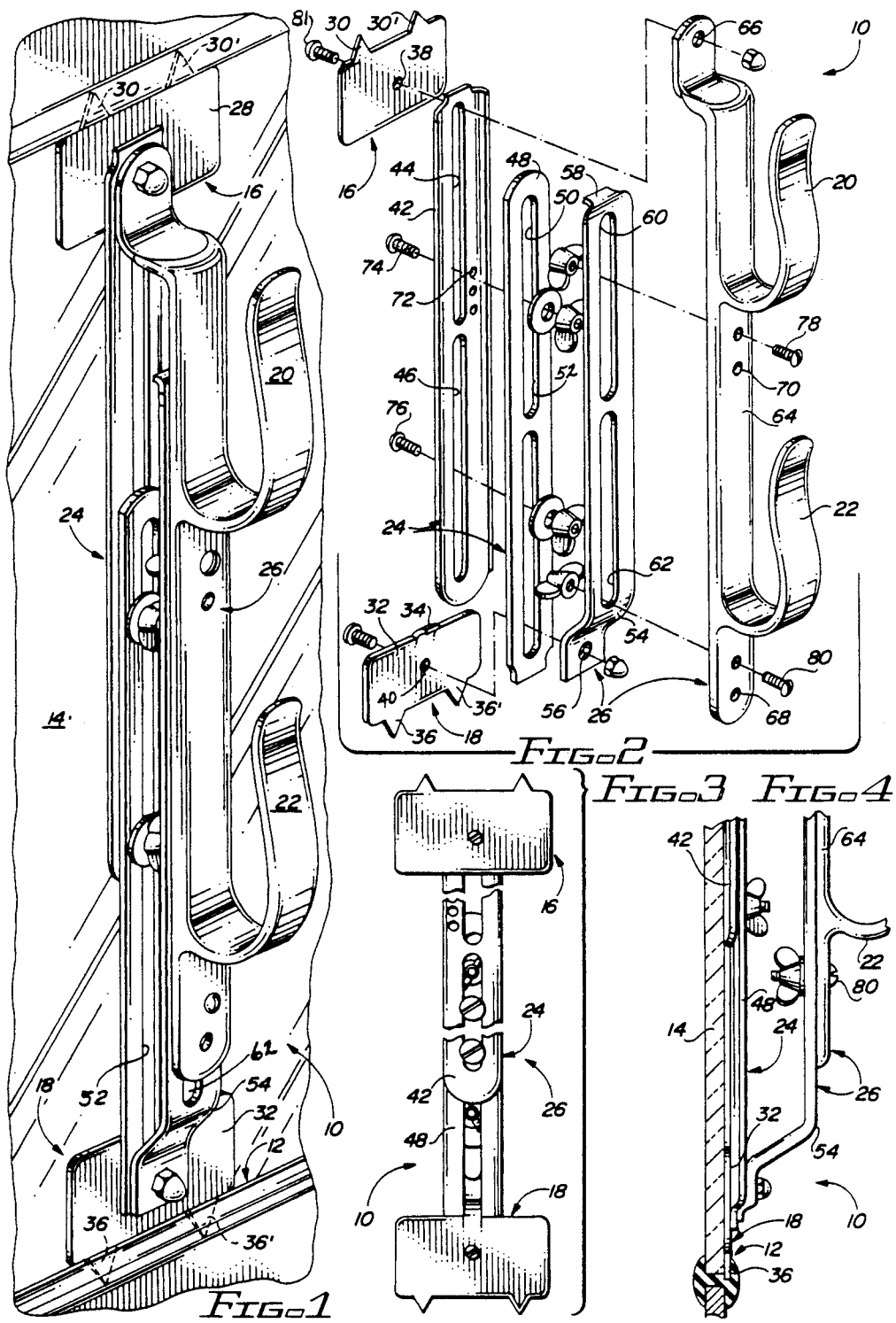

ADJUSTABLE UNIVERSAL GUN RACK

BACKGROUND OF THE DISCLOSURE

In my previous U.S. Pat. Nos. 3,876,079; 3,931,893; 4,058,221 and Des. No. 238,228, there is disclosed a gun mount for attachment to the rear window of a vehicle. The gun mount includes spaced, similar, rack members, each having a main body which is made into a plurality of coacting parts that terminate in an attachment blade at opposed ends thereof. The two coacting parts are arranged respective to one another so that the attachment blades thereof oppose one another and can be extended respective to one another to thereby provide for a suitable range of adjustment therebetween. However, the range of adjustment is relatively small, and it is often inconvenient to place more than two cradles on each of the main body members of the racks.

This made it desirable to have made a available a gun rack which can be used for the rear window of a vehicle, such as a pickup truck, for example, as well as being used as a decorative rack mounted directly to any wall surface, for example, the wall surface of a home or hunting lodge. It was also found desirable to have made available a gun rack having a main body which is supported at each end thereof by attachment means wherein the attachment means can be moved respective to one another to provide a relatively great range of adjustment therebetween. U.S. Pat. Nos. 4,648,516 and 4,776,471 therefore made available a gun rack which accommodates more than two gun supporting cradles in the event the space considerations admit the length between the attachment means to be extended sufficiently to accommodate the extra cradles. Reference is also made to the art cited in the above patents, as well as the art cited in those patents, as well as the entire field of search mentioned in all of that multitude of patents.

All of these gun racks have worked exceptionally well in any number of different vehicles except for the window frame such as found in the General Motors 1988 Chevrolet pickup truck which has a rear window set in a frame made with hardly any gasket at all. Considerable difficulty is experienced in using some of the prior art gun racks, such as mentioned in the above patents, in this new vehicle window frame. One major drawback is the lack of structural rigidity the prior art gun racks provide for resisting loads applied perpendicularly to the racks, which easily bow the rack away from the window glass whenever it is subjected to side loads. This lateral load allows the rack to significantly shorten its effective length and become loosened in the window frame whereas the old window frames with the large resilient gasket could easily accommodate such a change as may be introduced into the configuration of the rack. The loosened gun rack is undesirable because the guns supported therein could fall and inadvertently discharge upon striking the vehicle floor.

The present invention overcomes this dangerous and undesirable drawback by the provision of a second main body member arranged as a spreader bar to resist lateral loads and therefore resist bowing so that the attachment blades remain secured to the opposed upper and lower runs of the window frame and according, the absence of a large prior art window gasket does not unduly interfere with the mounting of the improved gun rack apparatus. Further, the spreader bar is placed inwardly from the first body member so that the cradles can be formed on the first member which brings about unexpected results and provides a new and unusual gun rack apparatus that overcomes the above drawbacks and provides several advantages over the prior art devices.

SUMMARY OF THE INVENTION

A gun mount comprises two spaced adjustable gun racks, and each of the gun racks is arranged to be held in aligned position by the frame of a rear window of a pickup truck, for example. The racks each include an adjustable spreader bar that terminate in blades at opposed ends thereof, with the blades terminating in attached relationship respective to the frame of a vehicle window.

The spreader bar is spaced from a cradle support assembly which also has opposed ends that are attached to the blade members. The spreader bar and cradle support assembly are parallel and superimposed on one another. A cradle is attached to the cradle support assembly and provides the means by which firearms, fishing tackle, and other such paraphernalia can be supported and safely stored behind the driver of a pickup truck.

Both the cradle support assembly and the spreader bar are placed in compression and thereby urges the blade members apart, and the blade members have a flat surface thereon that bear against the window glass, and further include teeth that engage the interior of the window frame and thereby hold each of the racks in fixed relationship due to the parallel, compressive forces which urge the blade members away from one another. The cradle support assembly has opposed marginal lengths that terminate in fixed relationship respective to the opposed blade members and transfer the load of a fire arm into both the upper and lower blade members as well as adding to the structural integrity of the rack assembly.

Accordingly, a primary object of the present invention is the provision of an improved gun support apparatus by which fire arms and other elongated devices can be safely supported adjacent the rear window glass of a vehicle such as a pickup truck.

Another object of the present invention is the provision of an improved rack having opposed attachment means, one of which is adjustably received respective to the other.

A further object of this invention is the provision of an improved mount comprising a pair of spaced similar racks, each rack having one or a plurality of gun receiving cradles which are mounted respective to the main body of the rack, and spaced adjustable attachement means by which the racks can be fitted to a number of different windows.

An additional object of this invention is the provision of a gun mount having a pair of racks, with gun receiving cradles being mounted to a main body thereof which enables the effective length of the main body to be adjusted.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a fragmented, perspective, three-quarter, front view of a rack made in accordance with the present invention by which a fire arm can be supported;

FIG. 2 is a disassembled, three-quarter, front, perspective view of the apparatus disclosed in FIG. 1;

FIG. 3 is a broken, rear view of the apparatus disclosed in FIG. 1; and,

FIG. 4 is a detailed, fragmented, part cross-sectional, longitudinal view of the lower end of the rack disclosed in FIGS. 1 and 3.

DETAILED DESCRIPTION OF THE PREFERRED EMBODIMENT

In the figures of the drawings, there is disclosed a gun rack 10 made in accordance with the present invention. The gun rack, in conjunction with a second similar gun rack, provides a gun mount by which fire arms can be supported in the manner set forth in FIG. 1 of U.S. Pat. No. 4,776,471 and in FIG. 8 of U.S. Pat. No. 4,648,516, for example.

In FIGS. 1 and 4, numeral 12 broadly indicates the rear window frome of a pickup truck, and the window has the usual window glass 14 mounted therein. The gun rack 10 includes opposed anchoring devices which are in the form of attachment means 16 located at the upper end thereof and attachment means 18 located at the lower end thereof. The gun rack 10 supports an upper cradle or gun holding device 20 and a lower cradle or gun holding device 22. Each of the cradles preferably have 180 degrees of curvature that results in an upwardly opening gun support member having a resilient marginal free end that can be forced away from the remainder of the gun rack, and which terminates in the illustrated outwardly curved members. Any number of cradles can be incorporated into the rack, as may be desired.

The gun rack 10 has a spreader bar that forms an inner support assembly 24 located adjacent and parallel to the window glass 14; and, a cradle support assembly 26 spaced from and parallel to the spreader bar. Both the spreader bar and cradle support assembly have opposed marginal ends affixed to the upper and lower attachment means. The upper attachment means 16 is in the form of a blade member having an outer face 28 and having teeth 30, 30' formed at the terminal end thereof. The lower attachment means 18 is similarly formed into a blade member having another face 32 which has a tab 34 arranged perpendicularly thereto and teeth 36, 36' at the terminal end thereof.

The face 28 of the upper attachment means preferably is in the form of a rectangular plate with the teen 30, 30' being an integral part thereof and located at the upper edge thereof to better permit the upper end of the gun rack being anchored or removably affixed to the frame of a vehicle rear window.

The lower attachment means likewise has a front face that defines an elongated rectangle and, as best seen in FIG. 2, further includes a bent tab 34 found at the upper edge thereof and spaced teeth 36, 36' located at the lower edge thereof. The opposed blade members are each apertured at 38 and 40 for accommodating the marginal end of both the spreader bar and cradle support assembly.

The spreader bar includes an inner, upper member 42 having a longitudinal extending centrally located slot 44 formed therein and a similar slot 46 disposed therebelow. The lower member 48 of the spreader bar similarly has longitudinally extending spaced slots 50 and 52 formed therein, and the slots 44, 50 and 46, 52 slidably register with one another so that the members 42 and 48 can be bolted toghether in an adjustable manner.

The cradle support assembly includes a pair of outer members, one of which is indicated by numeral 54. The member 54 inwardly curves to provide an apertured marginal end having bolt hole 56 formed therein. The opposed end is inwardly curved to form a standoff 58. Numerals 60 and 62 indicate longitudinally extending spaced slots.

The outer upper member 64 has an upper end that receives two ninety degree bends and is apertured at the opposed marginal ends 66, 68 thereof. These and the other apertures, 70, 72, receive screws 74-81 therethrough and thereby adjustably connect the coacting parts together. The illustrated screw 81, by which the blade members are attached to the spreader bar and cradle support assembly, preferably is countered-sunk so that it hardly contacts the glass, in a manner as seen in FIG. 4.

In operation, the apparatus of the present invention is assembled in the manner of FIGS. 1, 2, and 4 with all of the screws being loosened, and then the blade members are moved apart as the teeth thereof are inserted in the groove of the window frame 12 in the illustrated manner of FIG. 1 or 4. All of the nuts are made up tight with both the spreader bar and the cradle support assembly being placed in compression. This provides a rigid structure which will not become loose and move about respective to the window frame 12 when the main body members are laterally loaded. The resultant structure is in the form of a cross-section of a box spar which, of course, is the same sort of configuration used for a number of different cantilever structures. The boxed configuration avoids the tendency of the outer member 26 to bow and effectively shorten its length whereby the rack would otherwise then move about within the window frame. This unusual and unexpected resuslt provides a gun rack that can be used in conjunction with a second similar gun rack spaced therefrom for safely mounting fire arms adjacent the rear window of a vehicle without the danger of the racks becoming loosened respective to the frame and the guns inadvertently falling therefrom.

I claim:

1. A gun rack for mounting guns in supported relationship thereon; said rack includes an inner support assembly, an outer support assembly spaced from said inner support assembly, and an upper and a lower attachment blade; said inner support assembly has opposed marginal terminal ends;

fastener means by which the upper and lower attachment blades, respectively, are attached to the opposed marginal terminal ends, respectively, of said inner support assembly;

said outer support assembly has opposed marginal terminal ends; fastener means by which said opposed marginal terminal ends, respectively, of said outer support assembly are connected to said upper and lower attachment blades, respectively;

said inner support assembly further includes adjacent, overlapping, marginal ends adjustably received respective to one another;

said outer support assembly further includes adjacent, overlapping, marginal ends adjustably received respective to one another;

and further including upwardly opening cradle means attached to said outer support assembly by which at least part of an elongated object, such as a gun, can be supportedly received thereon.

2. The apparatus of claim 1 wehrein said upper and lower attachment blades each have teeth at the outermost end thereof for engaging an interior of a window frame.

3. The gun rack of claim 1 wherein said attachment blade has a marginal edge portion which is sufficiently thin in cross-section to be received between the gasket and glass associated with a window, whereby the marginal edge of the blade can be forced between the gasket and glass to hold the rack in mounted relationship therewith.

4. The gun rack of claim 1 wherein said inner support assembly and said outer support assembly each include spaced, elongated, longitudinally extending slots formed therein, said outer support assembly has a part thereof that is slidably received within one of said slots and thereby holds the outer support assembly in aligned relationship respective to the two marginal lengths thereof and slidably positions the outer support assembly along the length of said inner support assembly.

5. A gun rack for mounting guns in supported relationship thereon; said rack includes a main body having opposed end; upper and lower attachment means; said main body terminates in said attachment means at the opposed ends thereof; said main body includes a cradle support assembly and a spreader bar; said cradle support assembly has a medial part spaced from a medial part of said spreeader bar;

said spreader bar includes an upper member and a lower member having marginal lengths that overlap one another and further including marginal opposed ends that are affixed to said upper and lower attachement means;

said cradle support assembly includes an outer, upper member and an outer, lower member having marginal lengths that overlap one another; and, opposed marginal ends attached to said attachment means and to the opposed marginal ends of said spreader bar;

and further including means forming at least one upwardly opening cradle on said cradle support assembly by which fire arms and the like can be at least partially supported therein;

and whereby said attachment means can be maintained biased away from one another by said spreader bar and thereby forced into attached relationship respective to a window frame.

6. The apparatus of claim 5 wherein said attachment means is in the form of a blade member having teeth at the outermost end thereof for engaging an inner surface of a window frame.

7. The gun rack of claim 5 wherein said attachment means includes a blade having a marginal edge portion which is sufficiently thin in cross-section to the received between a gasket and glass associated with a rear window of a vehicle, whereby the fmarginal edge of the blade can be forced between the gasket and glass to hold the rack in mounted relationship therewith.

8. The gun rack of claim 5 wherein said spreader bar and said cradle support assembly each include spaced, elongated, longitudinally extending slots formed therein, said cradle support assembly has a tongue which is slidably received within one of said slots and thereby holds the cradle support assembly in aligned relationship respective to the two marginal lengths thereof and to be slidably positioned along the length of said main body.

9. A gun rack for mounting guns in supported relationship thereon; said rack includes a main body having inner and outer members, said inner and outer members have opposed ends, and upper and lower attachment blade members; said inner and outer members are connected at opposed ends thereof to said upper and lower attachment blade members; said inner member being in the form of a spreader bar and said outer member being in the form of a cradle support assembly;

said spreader bar and said cradle support assembly each have adjacent marginal ends and opposed marginal ends; said adjacent marginal ends of said spreader bar are spaced apart from said adjacent marginal ends of said cradle support assembly; said adjacent marginal ends of said spreader bar and said cradle support assembly are adjustably received respective to one another, and, said opposed marginal ends, respectively, attached to said upper attachment blade member and said lower attachment blade member, respectively;

said cradle support assembly including upwardly opening cradle means by which at least part of an elongated object, such as a gun, can be supportedly received thereon.

10. The apparatus of claim 9 wherein said attachment blade members are in the form of a thin rectangular member having teeth at the outermost end thereof for engaging the interior of a window frame.

11. The gun rack of claim 9 wherein said upper and lower attachment blade members include a rectangular configuration having a marginal edge portion which, in cross-section, is sufficiently thin to be received between the gasket and glass associated with a rear window of a vehicle, whereby the marginal edge of the blade can be forced between the gasket and glass and thereby support the rack in mounted relationship therewith.

12. The gun rack of claim 9 wherein said spreader bar and said cradle support assembly each include spaced, elongated, longitudinally extending slots formed therein, said cradle support assembly has a tongue which is slidably received within one of said slots and thereby holds the cradle support assembly in aligned relationship respective to the two marginal lengths thereof and to be slidably positioned along the length of said main body; one adjacent marginal end of said outer member has a tongue which is slidably received within one of said slots and thereby enables the cradle to be slidably positioned along the length of said main body.

* * * * *